United States Patent [19]

Coppens et al.

[11] Patent Number: 4,685,100
[45] Date of Patent: Aug. 4, 1987

[54] DIGITAL TRUNK ADAPTER TERMINAL UNIT

[75] Inventors: Christian Coppens, Velizy; Gilbert Perron, Plaisir; Jean Pouillard, Villeneuve Saint Georges, all of France

[73] Assignee: Compagnie Industrielle des Telecommunications Cit-Alcatel, Paris, France

[21] Appl. No.: 743,844

[22] Filed: Jun. 12, 1985

[30] Foreign Application Priority Data

Jun. 12, 1984 [FR] France ............................... 84 09151

[51] Int. Cl.⁴ ......................... H04Q 11/04; H04J 3/12
[52] U.S. Cl. .................................... 370/58; 370/110.1
[58] Field of Search ......................... 370/58, 110.1, 63; 179/18 DP, 18 GE; 340/825.79, 825.8

[56] References Cited
U.S. PATENT DOCUMENTS 4,491,944 1/1985 Caizergues et al. .................. 370/58
4,499,575 2/1985 Dupuis et al. ......................... 370/58
4,546,469 10/1985 Farrel et al. ...................... 370/110.1

*Primary Examiner*—Douglas W. Olms
*Assistant Examiner*—Frank M. Scutch, III
*Attorney, Agent, or Firm*—Sughrue, Mion, Zinn, Macpeak, and Seas

[57] ABSTRACT

An adapter terminal unit is designed to connect to the time-division switching center of which it forms part at least one digital trunk to a standard different to that normally applicable to the digital trunks associated with the switching center. Each adapter terminal unit, equipped with a microprocessor-based control circuit, is connected by a switching matrix to the input/output lines of the switching center's switching matrix. It further comprises a data and signaling transfer device connected to the switching matrix and to a transmitter device and to a receiver device, one at the end of a transmit multiplex link and the other at the end of a receive multiplex link of the digital trunk. In this way the standard changes necessary for exchanges between the digital trunk and the switching center are effected.

11 Claims, 9 Drawing Figures

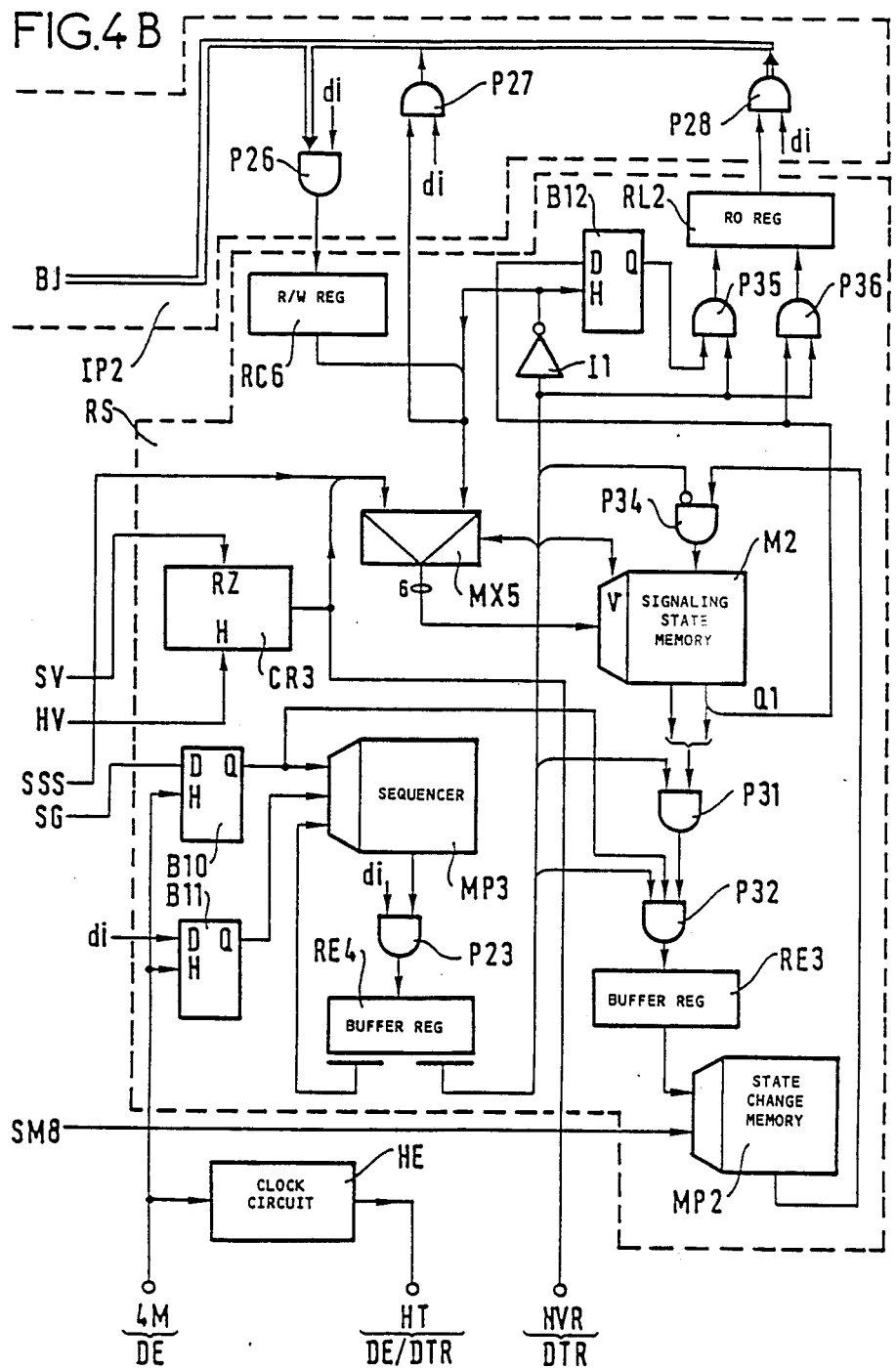

DIGITAL TRUNK ADAPTER TERMINAL UNIT

BACKGROUND OF THE INVENTION

1. Field of the Invention

An object of the present invention is an adapter terminal unit for digital trunks to a standard different to that normally applicable to the digital trunks associated with a time-division switching center which for the purposes of such adaptation is provided with at least one such unit.

2. Description of the Prior Art

As is known, there exist two types of primary PCM multiplex equipment as defined by CCITT Recommendations G.732 and G.733 and it is therefore necessary to be able to connect digital trunks linking equipments conforming to one of these two standards with terminal units of time-division switching centers provided for equipment conforming to the other standard.

It will be remembered that Recommendation G.732 concerns multiplex links with 32 channel time slots operating at 2 048 kbit/s and that Recommendation G.733 concerns links with 24 channel time slots operating at 1 544 kbit/s, both having the same frame duration and the same sampling frequency.

The frame of links conforming to Recommendation G.732 comprise 30 channel time slots for 8-bit samples, the speech signal samples on them being encoded according to the A law, two of the 32 channel time slots of each frame being reserved, channel time slot zero providing for the transmission of the frame alignment signal and channel time slot 16 for the transmission of signaling bits, except in frame zero which is reserved for the multiframe alignment signal.

The multiframe consisting of 16 consecutive frame permits the transmission of four signaling bits for each of the 30 speech channels, eight bits at a time in channel time slot 16 of the last 15 frames.

The frame of links conforming to Recommendation G.733 comprise 24 channel time slots for 8-bit samples and a supplementary bit; the speech signal samples are encoded according to the $\mu$-law, those of frames 6 and 12 of the 12-frame multiframe being coded on seven bits only, the eighth bit being used to carry the signaling associated with the channel which comprises it and being conventionally called bit A for the eighth bits of frame 6 and bit B for those of frame 12. The supplementary bit is used alternately for frame synchronization every two frames and for multiframe synchronization or alarm purposes betweentimes.

Common channel signaling may be used with both types of link outlined above.

The adapter terminal unit in accordance with the invention is designed to permit the connection to a time-division switching center of at least one digital trunk normally not connectable to the switching center by virtue of differences of standards between them and this is the case in particular when the switching center is of the type described in French Patent Application No. 2 503 513, designed originally to be connected to digital trunks conforming to Recommendation G.732.

In a switching center of this kind, as is known, the terminal units are conventionally connected to a switching network by multiplex links and they are controlled by a pool of control units also connected to the switching network by multiplex links to permit the exchange of messages between the microprocessors of the terminal units and those of the control units.

The connection to the switching center of digital trunks which are not to the standard provided for therefore implies modification for the purpose of adapting the signals transmitted or to be transmitted over the non-standard digital trunks from or through the switching center.

The objective of the present invention is thus an adapter terminal unit which is identical to the other terminal units of the switching center as seen from the control units of the switching center, which processes the signals on the digital trunk which it connects according to the standards applicable to this digital trunk, as seen from the end of this trunk to which it is not connected, and which handles the various adaptation operations on an autonomous basis, under the control of the microprocessor which it conventionally comprises and with the assistance of automatic devices which are specific to it.

In practice, this adapter terminal unit uses the same control and connection infrastructure as described in French Patent Application No. 82 20407 relating to a mixer terminal unit obviously equipped with different specific equipment.

SUMMARY OF THE INVENTION

The present invention consists in an adapter terminal unit for connecting to a time-division switching center at least one digital trunk to a standard different to that normally applicable to the digital trunks connected to said switching center, of which said adapter terminal unit constitutes part, together with other terminal units identically equipped with a microprocessor-based control circuit and controlled via the switching network of the switching center by a pool of control units which are also equipped with microprocessors and connected to the switching network by multiplex links called switching network input/output lines, as are also the adapter terminal units which to this end comprise a space-division switching matrix, said adapter terminal unit comprising a transmitter device, a receiver device and a transfer device controlled by the microprocessor of the control circuit of the unit via a bus to which they are linked, said transmitter device being connected to one end of a transmit multiplex link of the digital trunk, for the purpose of sending samples combining information bits from the switching center and supervisory signals provided in matched form via the microprocessor, said receiver device being connected to the end of a receive multiplex link of the digital trunk, for the purpose of separating the information bits to be sent via the switching center and the supervisory signals to be matched via the microprocessor for processing by the control units, and said transfer device being connected to the switching matrix via a bidirectional multiplex link, to the transmitter device and to the receiver device, for the purpose of two-way exchange of samples between the digital trunk and the switching center, following conversion and matching under the control of the microprocessor of the unit.

The invention, its characteristics and its advantages are described in more detail in the following description with reference to the accompanying drawings.

BRIEF DESCRIPTION OF THE DRAWINGS

FIGS. 4a, 4b are block diagrams of a receiver device provided in the dedicated terminal unit according to the invention.

DESCRIPTION OF THE PREFERRED EMBODIMENT

Figure 1:
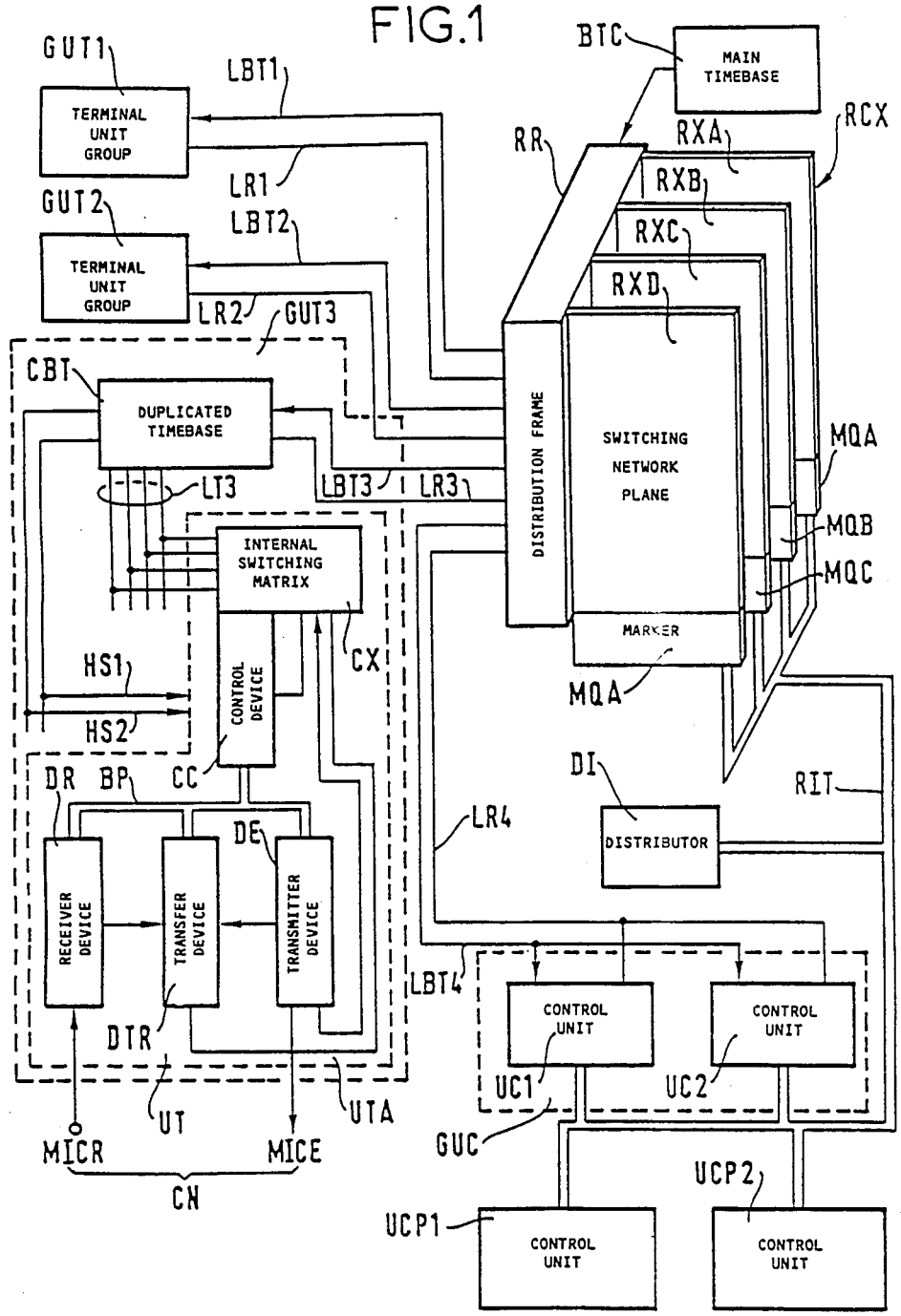
FIG. 1 shows known time-division switching center into which the terminal unit in accordance with the invention is incorporated.

The distributed architecture time-division switching center shown in FIG. 1 conventionally comprises a time-division switching network RCX which is in this instance formed of four independent planes RXA, RXB, RXC, RXD individually controlled by markers reference MQA through MQD. The switching center as a whole is controlled by a pool comprising two sets of microprocessor-based control units UC and UCP.

The UCP control units, such as units UCP1 and UCP2, handle management functions. The UC control units, such as units UC1 and UC2, control groups of terminal units UT which are specifically connected to the subscriber lines, to the communication digital trunks or to the signaling processing trunks and sender/receivers.

The UC units are connected to one another, to the markers MQ and to the UCP, or management, control units by a duplicated high-speed serial interprocessor data link RIT and via a distributor DI. They are also connected to the switching network RCX as well as the terminal units such as unit UT of group GUT3.

A main timebase BTC supplies clock signals to the terminal units UT and to the control units UC through the intermediary of interfaces (not shown) of a distribution frame RR connected to the inputs/outputs of the switching network RCX.

The terminal units, such as unit UT, and the control units UC are connected to the switching network RCX via the distribution frame RR through the intermediary of bidirectional multiplex links LR called switching network input/output lines. Each of the LR links conventionally serves a plurality of terminal units forming a group GUT, such as group GUT1, or a plurality of control units forming a group, such as group GUC1. Duplicated distribution links LBT, such as link LBT1 for group GUC1, transmit clock signals from the main timebase BTC to the control units or to the terminal units of the groups that they serve.

A duplicated timebase circuit CBT provides the interface between the terminal units or control units of a group and the LR links and timebase distribution links which serve it.

Figure 2:
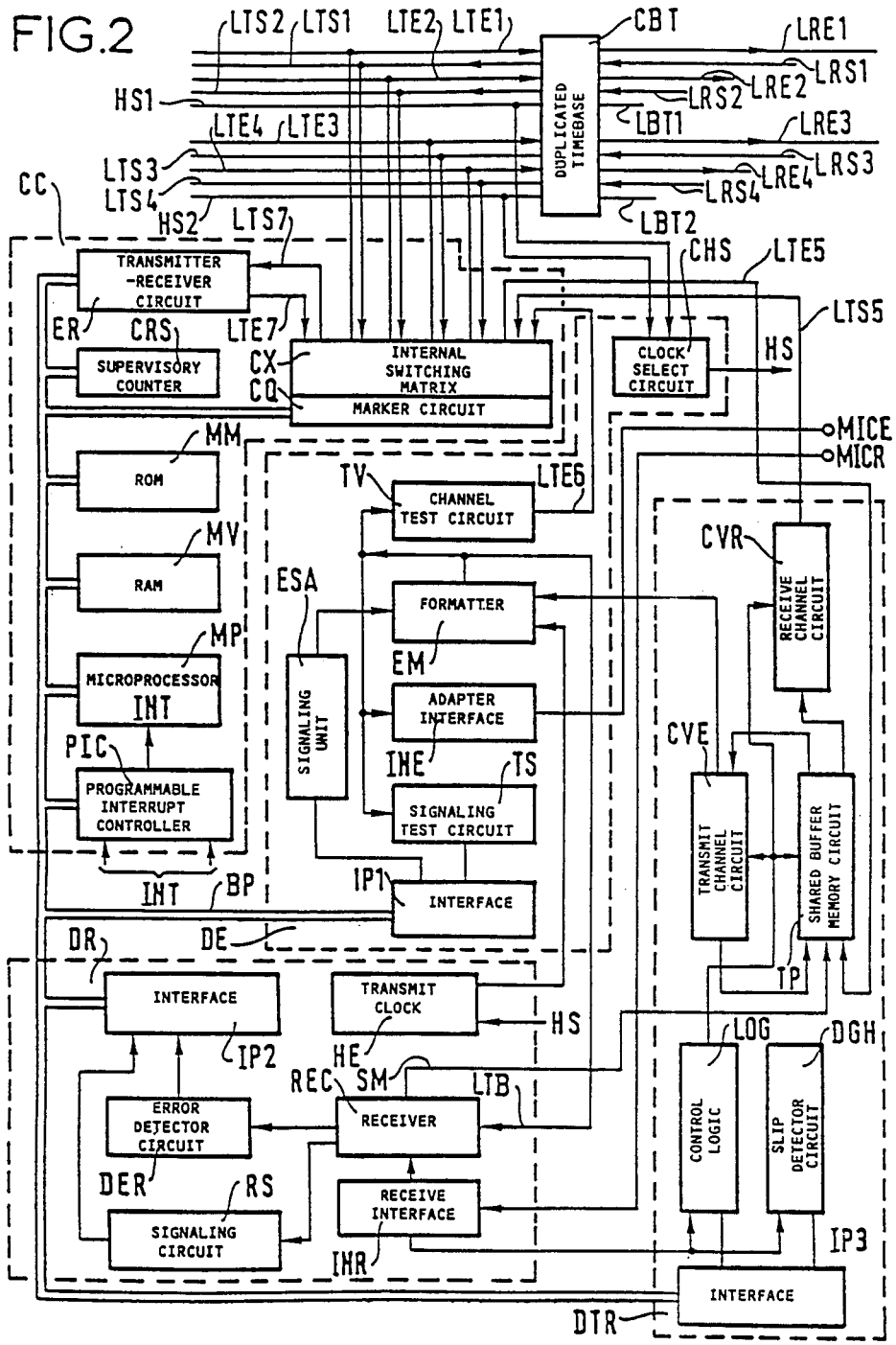
FIG. 2 shows a terminal unit in accordance with the invention, which has the dedicated function of connecting PCM time-division multiplex links on the one hand to European standards and on the other hand to American standards.

In the example shown in FIG. 2, an LR link such as link LR3 is shown in detail; it comprises four incoming unit links LRE1 through LRE4 directed to the switching network RCX (not shown) and four outgoing unit links LRS1 through LRS4, connecting the switching network to the timebase circuit CBT which also receives the clock signals from the main timebase via two distribution links LBT1 and LBT2 (FIG. 2).

The duplicated timebase circuit CBT serves separately two groups each consisting of a pair of incoming unit links LRE, a pair of outgoing unit links LRS and a distribution link LBT. Each timebase circuit CBT connects and synchronizes a group LT of four internal multiplex links LTE1 through LTE4 directed towards itself and four internal multiplex links LTS1 through LTS4 directed in the opposite direction, respectively to the four incoming unit links LRE1 through LRE4 and to the four outgoing unit links LRS1 through LRS4 which this circuit CBT receives.

The circuit CBT (which is, for example, of the type described in French patent application No. 81 17643) also handles production of the clock signals transmitted on internal distribution links HS1, HS2 to the group served, from the signals received on the distribution links LBT1, LBT2.

The terminal links of an LT group serving a group of terminal units are connected to an internal switching matrix CX of each terminal unit, as is shown in FIG. 1 for the digital trunk adapter terminal unit UTA in accordance with the invention.

Each terminal unit thus comprises a conventional control device CC to be described in more detail hereinafter with reference to FIG. 2.

A digital trunk adapter terminal unit UTA specifically comprises (FIGS. 1 and 2):

a transmitter device DE connected to a transmit multiplex link MICE of a digital trunk CN which is directed towards the switching center mentioned hereinabove, it being understood that this switching center is designed for multiplex links with a transmission standard differing from that governing the transmission of samples over the transmit link MICE in question;

a receiver device DR which connects the switching center to a receive multiplex link MICR of the digital trunk CN, transmission on this receive link being governed by the same standard as applies to the transmit link MICE with which it is associated;

a transfer device DTR inserted between the transmitter device DE and the receiver device DR and like them connected to the control device CC through the intermediary of a common bus BP.

In the embodiment shown, the incoming and/or outgoing terminal links connect the transmitter device DE, transfer device DTR and control device CC to the switching matrix CX for the purposes of exchanges with the switching center control units UC.

The control device CC (FIG. 2) comprises a microprocessor MP, a random access memory MV, a read only memory MM, a microprocessor interrupt controller PIC, a supervisory counter CRS and a transmitter-receiver circuit ER which enables the microprocessor MP to receive messages using the HDLC protocol via the internal switching matrix CX and the terminal links LTE7, LTS7 which are assigned to it for this purpose.

The switcing matrix CX is connected to the timebase circuit CBT of the group via the internal multiplex links LTE2 through LTE4 and LTS1 through LTS4, to the transfer device DTR via terminal multiplex links LTE5, LTS5 in opposite directions, to the transmitter device DE via an incoming terminal multiplex link LTE6, and to the transmitter-receiver circuit by two multiplex links LTE7, LTS7 in opposite directions, within the terminal unit UTN in the case of the latter three devices.

Also, two incoming links (not shown) continuously provide status signals, one at 0 and the other at 1, for the requirements of channels which are inactive or subject to an alarm condition.

The switching matrix CX is controlled in the conventional manner by means of the microprocessor MP and via an appropriate marker circuit CQ, the matrix being of the space-division type in the embodiment proposed.

The transmitter device DE principally comprises a formatter EM for assembling signals to be transmitted in the frame of the transmit multiplex link MICE: this transmission is effected through the intermediary of a conventional adapter interface INE essentially handling adaptation of the levels of the signals transmitted and transcoding into the transmission code, in the present instance from NRZ code to AMI code.

The formatter EM receives data from the transfer device DTR and common channel signaling.

The channel-associated signaling information and alarm information is supplied to the formatter EM by the microprocessor MP via an interface IP1 and via a signaling unit ESA in the case of alarms.

A signaling test circuit TS is used to return signaling to be transmitted to the microprocessor MP for purposes of verification.

A channel test circuit TV connects the output of the formatter EM to the switching matrix CX via the multiplex link LTE6, to provide for testing the transmit channel as a whole, the link LTE6 being then connected through one of the links LRE1 through LTE4 to the switching network of the switching center, via a link LTE1 through LTE4 between the switching matrix and the timebase circuit CBT of the group.

The transmitter device DE also contains a clock select circuit CHS which receives the internal distribution links HS1 and HS2 and under the control of the microprocessor MP selects the clock and synchronization signals HS supplied by one or the other of the distribution links to transmit them to the circuits of the terminal unit where they are processed.

The receiver device DR principally comprises a receiver REC connected to the output of the multiplex link MICR of the digital trunk CN processed via a receive interface INR. This conventional type interface INR implements, inter alia, transcoding of the transmission code into the binary processing code, recovery of the remote clock signals having governed transmission over the multiplex link MICR and the changes of frequency necessary for processing the received signals.

The receiver REC sends the data received from the multiplex link MICR to the transfer device DTR, along with the received signaling when this is common channel signaling. On the other hand, if the signaling received is channel-associated signaling, it is transmitted by the receiver REC to the microprocessor MP via a signaling circuit RS and an interface IP2 itself connected to the common bus BP serving the microprocessor MP.

An error detector circuit DER connected to the output of the receiver REC and to an input of the interface IP2 is used to indicate receive errors to the microprocessor MP.

A link LTB between the formatter EM and the receiver REC provides for loopback testing of the transmit and receive system of the terminal unit UT.

The receiver device DR also comprises a transmit clock HE which supplies to the transmitter device DE signals based on the clock signals HS, for purposes which will be described later.

The transfer device DTR handles the format change required for bidirectional transmission of signals between multiplex links LTE, LTS internal to the switching center and multiplex links MICR, MICE of the external digital trunk CN.

To this end the transfer device is controlled by control logic LOG connected to the microprocessor MP via an interface IP3 and the bus BP.

In the transmission direction from the internal multiplex link LTE5 to the multiplex link MICE of the digital trunk CN, the link LTE5 terminates at a shared buffer memory circuit TP which serves inter alia a transmit channel circuit CVE. This circuit CVE is used to carry out ancillary operations under the control of the control logic LOG, such as inserting synchronization data into the channel time slot reserved for this purpose during consecutive frames, recognising the channel state (active channel or idle channel), and setting the level of the signals to be processed.

In the transmission direction from the multiplex link MICR to the outgoing multiplex link LT55, the output SM of the receiver REC of the receiver device DR is also connected to the shared buffer memory circuit TP which also serves a receive channel circuit CVR the output of which feeds the internal multiplex link LTS5 to the switching matrix CX.

A slip detector circuit DGH is used to generate an interrupt request to the microprocessor MP in the event of slip between the local clock, governing in particular the terminal unit UT in question, and the remote clock recovered from the signals from the multiplex link MICR by the receiver interface INR. This request is generated when the slip is such that it requires either omission of a frame or duplication of a frame, by virtue of its size.

In this event the microprocessor MP alerts the switching center control units concerned.

The output of the shared buffer memory circuit TP is also connected to the transmit channel circuit VE in order to provide for testing the receiver device DR by loopback between the transmit and receive parts.

Figure 3A:
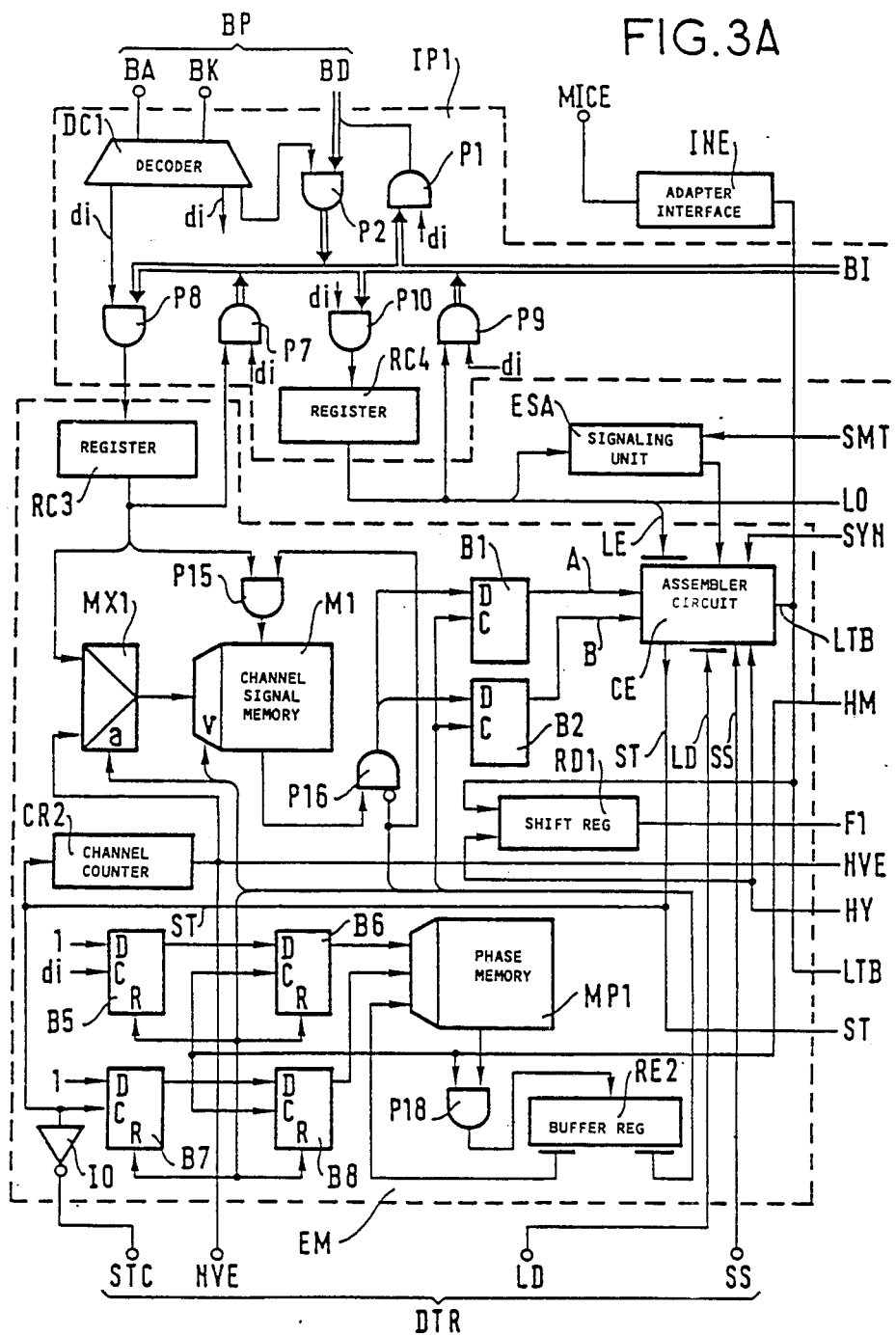
FIGS. 3A, 3B are block diagrams of a transmitter device provided in the adapter terminal unit in accordance with the invention.
Figure 3B:
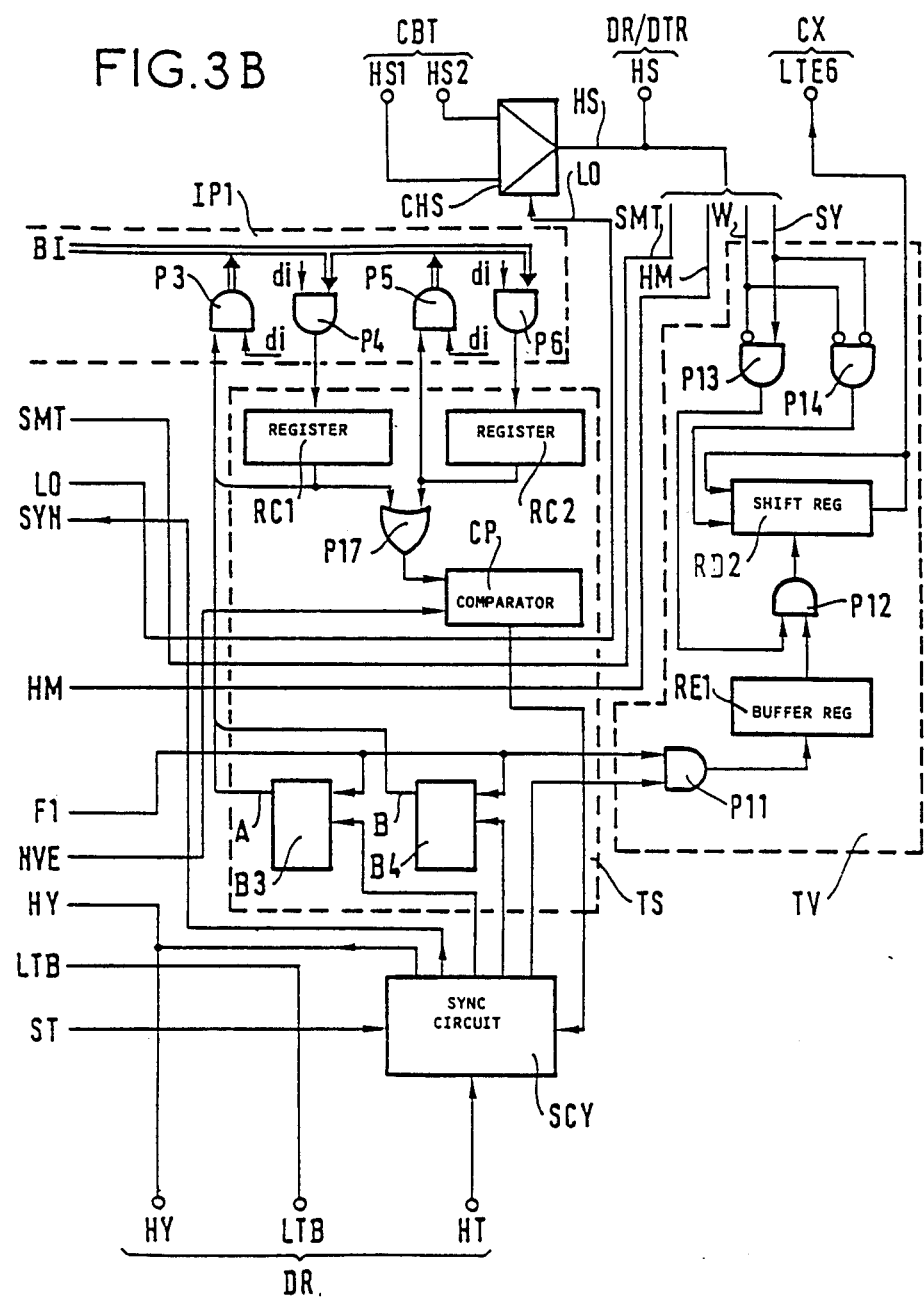

The transmitter device DE is shown in detail in FIGS. 3A and 3B.

The bus BP of the microprocessor MP is connected to the interface IP1, consisting of an address bus BA, a control bus BK and a data bus BD.

The interface IP1 comprises a decoder DC1 with its inputs connected to the address bus BA and the control bus BK and having outputs di connected to respective select, write or read inputs of various components of the transmitter device DE.

The interface IP1 also comprises a plurality of AND gates referenced P1 through P10 which selectively connect the data bus BD in transmit or receive mode via an internal bus BI to four registers RC1 through RC4 physically located in this interface but functionally associated with the circuits that they serve in FIGS. 3A and 3B in the case of the first three of them RC1 through RC3.

The gate circuits P1 through P10 are individually connected to outputs of the decoder DC1 which initiate exchanges between the data bus BD and registers RC1 through RC4 subject to control by the microprocessor MP, so as to be able either to write into the four registers for the purposes of execution by the transmitter device or for reading the four registers for purposes of testing by the microprocessor.

The clock signals necessary for operation of the transmitter device DE are obtained from the selector circuit CHS which consists of a multiplexer which receives the signals HS1 and HS2 from respective different duplicated parts of the duplicated timebase circuit CBT serving the terminal unit UT of which the transmitter device DE in question forms part.

The selector circuit CHS selects one or other of the signals HS1 and HS2 according to a bit transmitted by a link LO from the register RC4, called the control register, in which this bit is stored.

In the example given, the signals HS appearing at the output of the selector circuit CHS comprise inter alia a local multiframe synchronization signal SMT, a local frame synchronization signal SY and two clock signals W and 4M which in the example are respectively at 2.048 MHz and 4.096 MHz.

The formatter EM is based on a standard type assembler circuit CE, which may be an R8050 circuit produced by ROCKWELL INTERNATIONAL, for example.

This assembler circuit CE receives, for transmission over the multiplex link MICE:

the samples on eight bits provided in parallel by a multiwire link LD from the transfer link DTR;

the common channel signaling bit S which is supplied to it by the transfer device DTR via a link SS:

channel-associated signaling bits A and B provided by a channel signal memory M1 and temporarily stored in flip-flops B1 and B2.

The assembler circuit CE also receives instructions from the control register RC4 via a multiwire link LE, synchronization signals SY and clock signals HY from a synchronization circuit CY and alarm signals from the signaling unit ESA controlled by the microprocessor MP via the control register RC4.

The assembler circuit CE sends data bits over a serial link LTB to the adapter interface INE providing access to the multiplex link MICE, to the receiver device DR for purposes of loopback testing and to the signaling test circuit TS and channel test circuit TV via a shift register RD1. It also sends channel clock signals ST to the synchronization circuit SCY, to the transfer device DTR, by a link STC and via an inverter IO, for internal use in the transmitter EM itself.

The assembler circuit CE receives the A and B bits, that is to say bits 8 of the channel time slots of consecutive frames 6 and 12, from the channel signal memory M1 which is addressed by a multiplexer MX1 and which to this end contains 32 words each of two bits.

A first group of inputs of the multiplexer MX1 is connected to the outputs of the register RC3 which is adapted to contain on the one hand a channel number of five bits constituting a write address in memory M1 and on the other hand the bits A and B corresponding to this channel which are loaded into the memory M1 via an AND gate circuit P15.

A second group of inputs of the multiplexer MX1 is connected to the outputs of a channel counter CR2 controlled by the channel clock signals ST produced by the transmitter circuit; it handles read mode addressing of the channel signal memory M1.

The channel address provided at the outputs of the channel counter CR2 is also sent to the transfer device DTR via a link MVE, as is the channel clock signal ST complemented by the inverter IO via the link STC.

The output of the channel signal memory M1 is connected to the data inputs D of the flip-flops B1 and B2 via an AND gate P16 controlled by a buffer register RE2 connected to the output of a PROM type phase memory MP1.

The phase memory MP1 controls the operation of the transmitter device and more specifically the multiplexer MX1, the addressing of the channel signal memory M1 and the transmission of bits A and B to the flip-flops B1 and B2 via the gate P16.

Each time the phase memory MP1 is read, the read word is loaded into the buffer register RET via a multiple AND gate P18 which is controlled by the clock signal 4M.

Some of the binary data contained in register RE2 is used for read mode addressing the memory MP1 itself, each read address being completed by two bits respectively provided by two pairs of flip-flops B5, B6 and B7, B8 which respectively control the signaling write and read cycles of the channel signal memory M1.

The flip-flop B5 is activated by a signal di from the decoder DC1 and the flip-flop B7 is activated by the channel clock signal ST, the flip-flops B6 and B8 being activated by the clock signal 4M.

The other binary data loaded into the buffer register RE2 is not used for addressing the phase memory MP1; it secures the resetting to zero of the four flip-flops B5 through B8 via their corresponding R inputs, the addressing of the multiplexer MX1, the validation v of the memory M1, the activation C of the flip-flops B1, B2 via their clock inputs and access via gates P15 and P16 after inversion for the latter.

The synchronization circuit SCY receives clock signals HT from the transmit clock HE for transmission over the multiplex link MICE and the channel clock signals ST provided by the assembler circuit CE; it generates the clock signals HY for this assembler circuit CE, the shift register RD1 and the receiver device DR, the triggering signals for the signaling test circuit TS and the channel test circuit TV, and the synchronization signal SYN for the assembler circuit CE.

The channel test circuit TV comprises a buffer register RE1 inserted between the shift register RD1 via the wire F1 and a shift register RD2 providing access to the multiplex link LTE6 and consequently to the switching matrix CX for correct operation tests.

An AND gate P11 is situated between the register RD1, to which it is connected by the wire F1, and the buffer register RE1 to authorize transmission of data between these registers according to triggering signals from the synchronization arrangement SCY. A multiple AND gate P12 is situated between the buffer register RE1 and the shift register RD2; it handles the parallel transfer of the content of the former into the latter and the outputting of the binary data from the latter over the link LTE6 under the control of two AND gates P13 and P14 respectively receiving the signals W and SY for the gate P13 the output of which is connected to the input of gate P12 and signals W and SY for gate P14 the output of which is connected to the shift control input of the register RD2, this register also being looped on itself.

The signaling test circuit TS comprises two flip-flops B3 and B4 connected in parallel to the output of the shift register RD1 via the wire F1 and controlled by the synchronization arrangement SCY so as to store the bits A and B successively produced by the assembler circuit CE to permit them to be read by the microprocessor MP of the terminal unit comprising this test circuit. To this end the outputs of the flip-flops B3 and B4 are connected to an AND gate P3 connected by its output to the data bus BD and controlled by one of the outputs di of the decoder DC1.

For the transmit signaling test the register RC1 stores the number of the channel whose signaling is tested, this number being provided by the microprocessor MP, via the data bus BD to which the inputs of the register RC1 are connected, via the multiple gate P4. A comparator CP receives via an OR gate P17 either the number of the channel whose signaling is tested or the number of a channel that is required to be tested and which is supplied to it by the register RC2 in the case of loopback testing via the link LTE6. The comparator CP also receives the channel number provided by the counter CR2 so as to send a recognition signal in the event that the addresses received by it are identical; this recognition signal is transmitted to the synchronization circuit SCY which processes it to control the flip-flops B3, B4 when one of the addresses comes from the register RC1 and to control the loading of the register RE1 via the gate P11 when one of the addresses comes from the register RC2.

Figure 4A:
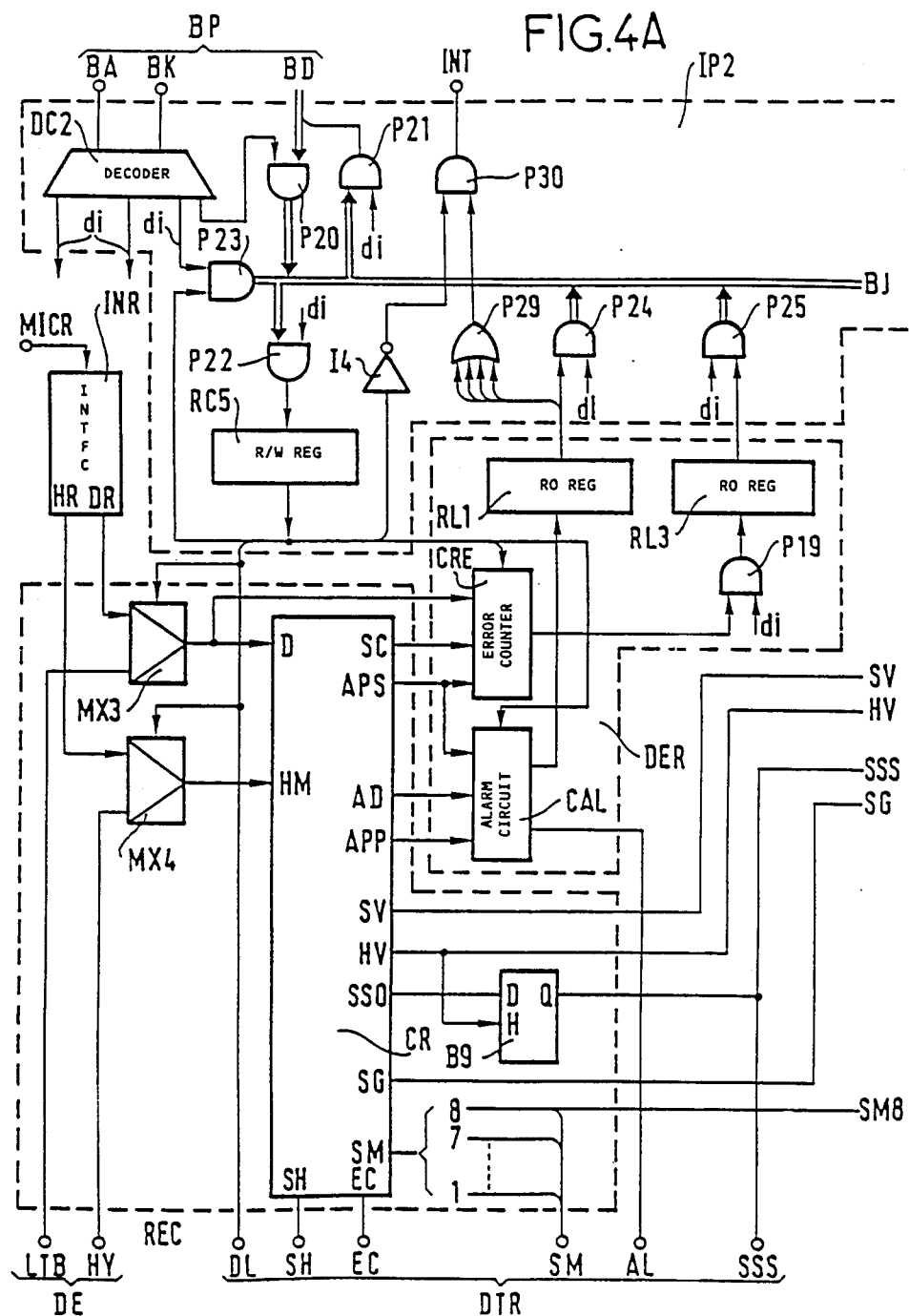

The receiver device DR shown in FIGS. 4A, 4B comprises firstly an interface IP2 analogous to the interface IP1 from which certain registers including RL1, RL2, RL3, RC6 have been detached in order to attach them to the circuits which they serve.

The interface IP2 thus comprises a decoder DC2 with inputs connected to the address bus BA and to the control bus BK of the microprocessor MP and outputs di connected to select, write and read inputs of various components of the receiver device DR.

It also comprises a plurality of gates P20 through P30 providing access to the data bus BD via the internal bus BJ of the interface IP2 and to two registers RC5 and RC6 accessible in read mode and in write mode and three registers RL1 through RL3 accessible only in read mode by the microprocessor MP.

The receiver REC is based on a receiver circuit CR which looks for the frame synchronization signal, checks for errors and extracts common channel signaling sent over the multiplex link MICR. The circuit used is, for example, an R8060 manufactured by ROCKWELL INTERNATIONAL.

This receiver circuit CR receives on its input:

the data signals received from the outside environment via the interface INR located at the output of the multiplex link MICR of the digital trunk served, these data signals being transmitted to its input D through the intermediary of a multiplexer MX3 controlled by one of the outputs of the control register RC5;

the remote clock signals recovered by the adapter interface INR, the corresponding output of which is connected to one input of a multiplexer MX4 controlled in exactly the same way as the multiplexer MX3 by the control register RC5.

Second inputs of multiplexers MX3, MX4 can be connected to outputs LTB and HY of the transmitter device DE for loopback operation for test purposes.

The receiver circuit CR extracts and supplies:

the common channel signaling bits transmitted over the multiplex link MICR to enable them to be temporarily stored by means of a flip-flop B9 connected to the corresponding output SSO of the receiver circuit;

a channel clock signal HV which controls the flip-flop B9 and a received channel counter CR3;

a channel synchronization signal SV which indicates the frame start and resets to zero the channel counter CR3;

a parallel 8-bit output for each of the samples successively received channel by channel, through the intermediary of a link SM connected to the transfer device DTR;

alarm outputs APS, AD, APP respectively corresponding to a loss of frame synchronization alarm, reception of a remote alarm and a loss of incoming signal alarm corresponding to a continuous zero state at the receiving end;

a output SC for counting frames on which synchronization is lost, in order to increment an error counter CRE which also receives the loss of frame synchronization alarm signals APS;

a clock output SH for signals transmitted on the common signaling channel, connected to the transfer device DTR;

an output SG indicating presence of channel-associated signaling in a received frame;

an output EC for write signals to the transfer device in the case of presence indication signals SG.

The three sorts of alarm APS, AD and APP are connected to an alarm circuit CAL able to transmit an alarm indication AL to the transfer device DTR and a detailed analysis of alarms to the register RL1 for transmission to the microprocessor MP via a multiple AND gate P24 which is controlled by one of the outputs di of the decoder DC2.

An OR gate P29 is used to send an interrupt request to the microprocessor MP via an AND gate P30 and a link INT terminating at the interrupt control circuit PIC associated with the microprocessor MP, such transmission being initiated in the event of an alarm transmitted to the register RL1 to the output of which the gate P29 is connected.

In a precisely identical manner, the error counter CRE has its outputs connected to the register RL3 via an AND gate P19 and via this register RL3 to the data bus BD, via a multiple AND gate P25.

The signaling circuit RS comprises a signaling state memory M2 adapted to contain two words each of three bits per channel, one corresponding to the signaling bit A received during frames 6 and the other to bit B received during frame 12, the three bits of each word constituting a status code for filtering the signaling bits.

Changes of state according to the last signaling bit received for a given channel are effected through the intermediary of a state change read only memory MP2 addressed on the one hand by the corresponding output word of the signaling state memory M2 which is fed to the addressing input of the memory MP2 via two AND gates P31, P32 and a buffer register RE3 and on the other hand by the bit of rank 8 corresponding to A or B which is provided on wire SM8 by the receiver circuit CR.

The gate P32 is controlled by the signaling present signal SG from the receiver circuit CR, which is stored in a flip-flop B10, this signal SG being present only during frames 6 and 12.

The operation of memories M2 and MP2 is controlled by a sequencer MP3 based on a read only memory. This sequencer MP3 has its outputs connected to a sequence buffer register RE4 via a multiple AND gate P33. Four bits from the sequence register RE4 are returned to the addressing inputs of the sequencer MP3 which are also able to receive a signaling present bit provided by the flip-flop B10 and a read control bit provided by a flip-flop B11 itself controlled by one of the outputs di of the decoder DC2, the two flip-flops B10 and B11 being controlled by the clock signal 4M. The other four output bits of the register RE4 control the validation input "v" of the signaling state memory M2, addressing the inputs of a multiplexer MX5 providing access to the addressing inputs of the memory M2, as well as the inputs of the gates P31, P32 mentioned above and a multiple AND gate P34 which is connected to the output of the state change memory MP2 and the enabling input of which is inverted relative to that of gate P31.

The multiplexer MX5 is used to address in read mode the signaling state memory M2 on the basis of an address comprising on the one hand the channel number supplied by the microprocessor of the terminal unit via the gate P26 and the select buffer register RC6 and on the other hand a bit supplied by the sequence register RE4 via an inverter I1.

The multiplexer MX5 is also used to address in read mode and in write mode the signaling state memory M2 on the basis of an address comprising on the one hand a channel number provided by the channel counter CR3 controlled by the channel clock signal HV and the channel synchronization signal SV produced by the receiver circuit CR and on the other hand the output signal of the flip-flop B9.

The signaling state memory M2 also supplies the state of the eighth bit of the channel time slots of frames 6 and 12, that is to say the bits A and B, to the buffer register RL2 for simultaneous transfer of the bits A and B for the same channel time slot to the microprocessor of the terminal unit via the gate P28 and the internal bus BJ.

The loading into the read buffer register RL2 of the bits A, B the channel number of which is in the select register RC6 is effected in two stages under the control of the sequencer MP3.

Firstly the bit A is extracted from a first part of the signaling state memory M2 and stored in a flip-flop B12 the output of which is connected to one input of the read register RL2 via an AND gate P35.

Secondly the bit B is extracted from a second part of the signaling state memory M2 and the transfer of the bits A and B relating to the same channel time slot is effected simultaneously via the gate P35 for bit A and an AND gate P36 for bit B, both gates being controlled by the signal applied to the input of the inverter I1 by the sequence register RE4. The output of the inverter I1 drives the flip-flop B12.

The read register RL2 and the channel register RC6 are respectively connected to the internal bus BJ by gates P28 and P27 which are controlled by separate outputs of the decoder DC2 and which provide for reading of the information contained in these two registers by the microprocessor of the terminal unit.

Finally, a clock circuit HE which receives the frame synchronization signal SY from the transmitter device DE and generates signals of frequency 3M which corresponds in the example selected to twice the transmission frequency of 1.544 MHz and is therefore 3.988 MHz, as well as a double frequency clock signal 6M. These signals 3M and 6M are produced for the benefit of the transmitter device DE and the transfer device to which they are transmitted via links symbolically represented by the link HT.

Figure 5A:
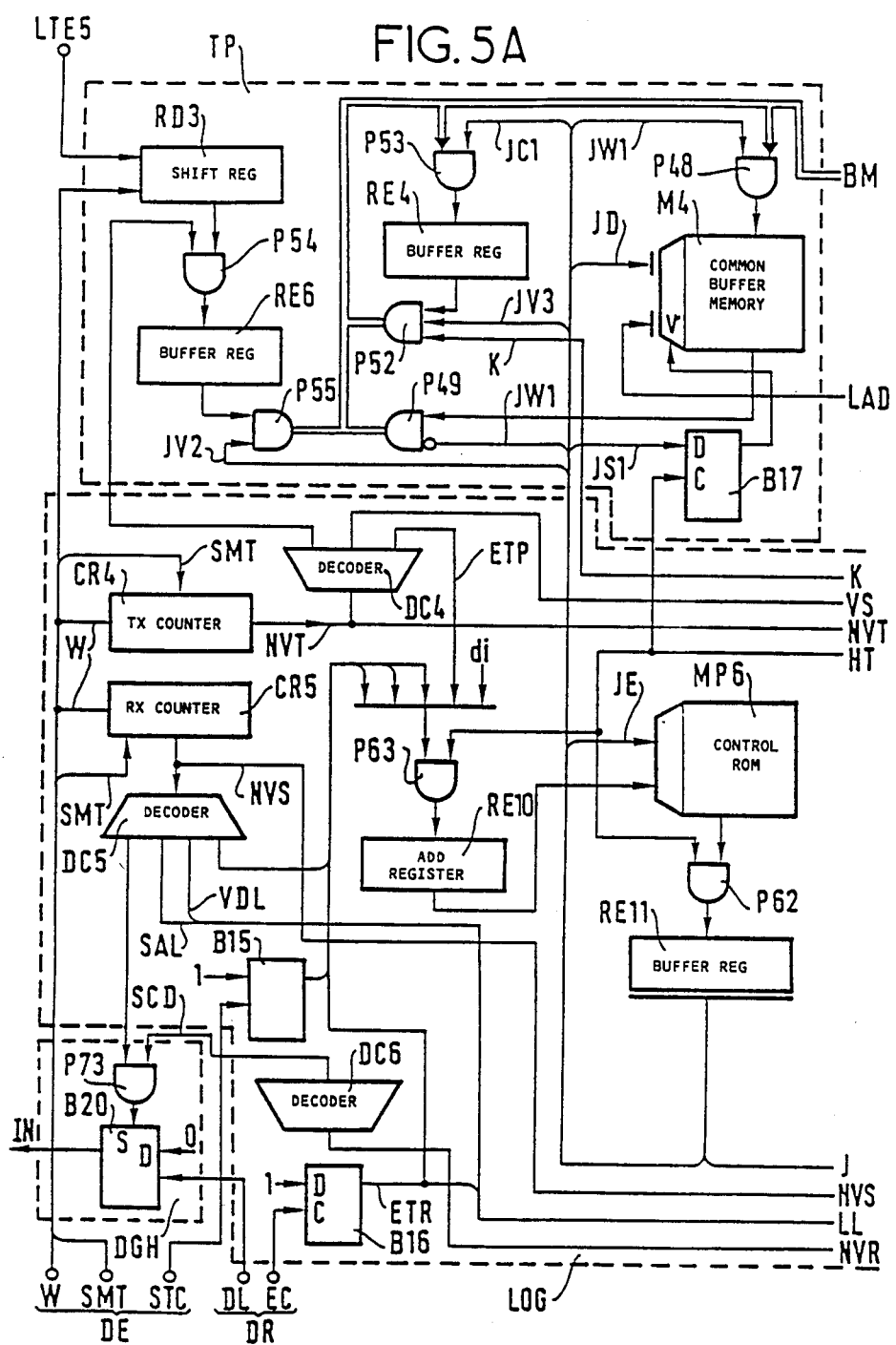
FIGS. 5A, 5B, 5C are block diagrams of an intermediate transfer device provided in the adapter terminal unit according to the invention.
Figure 5B:
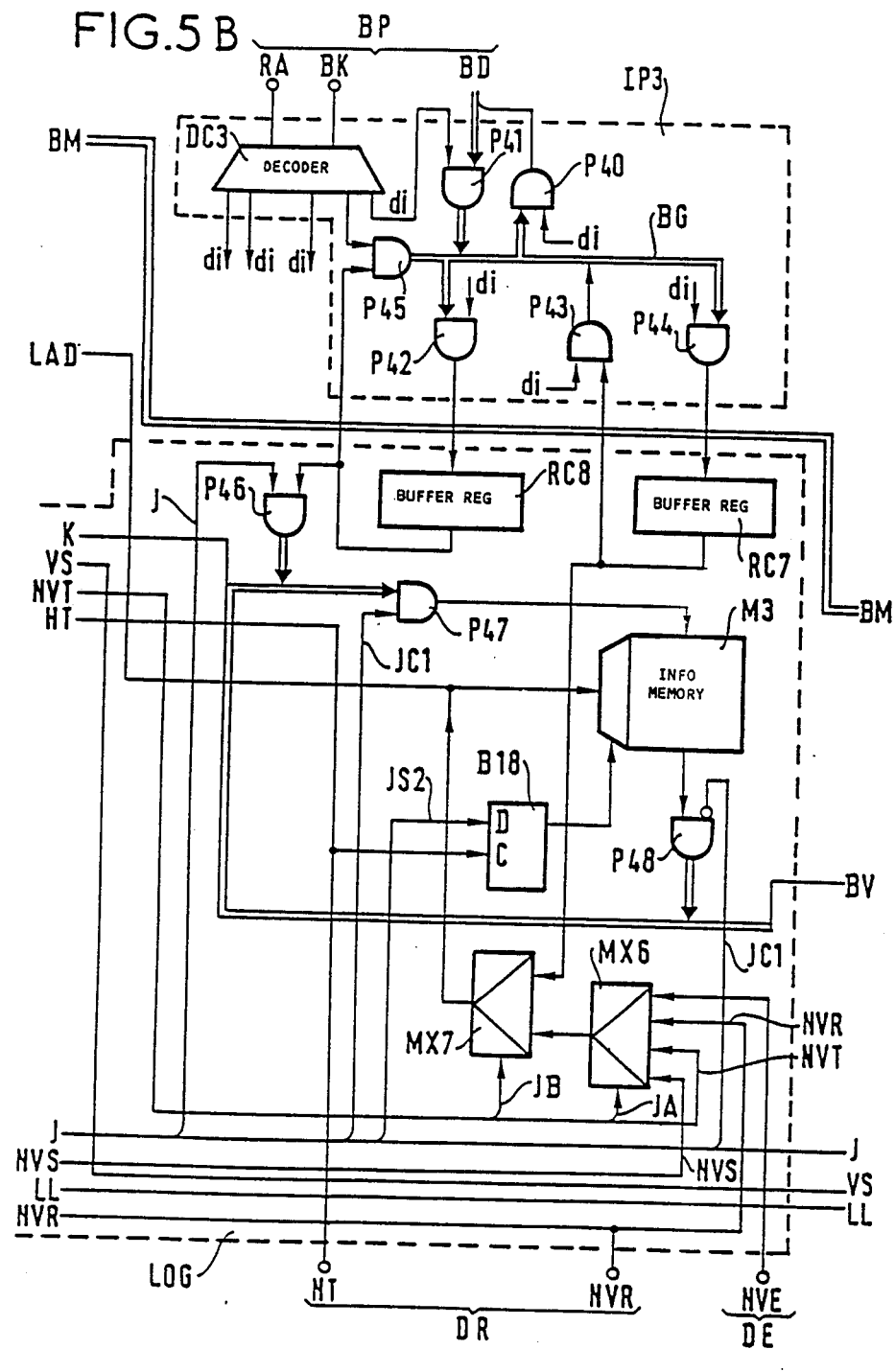
Figure 5C:
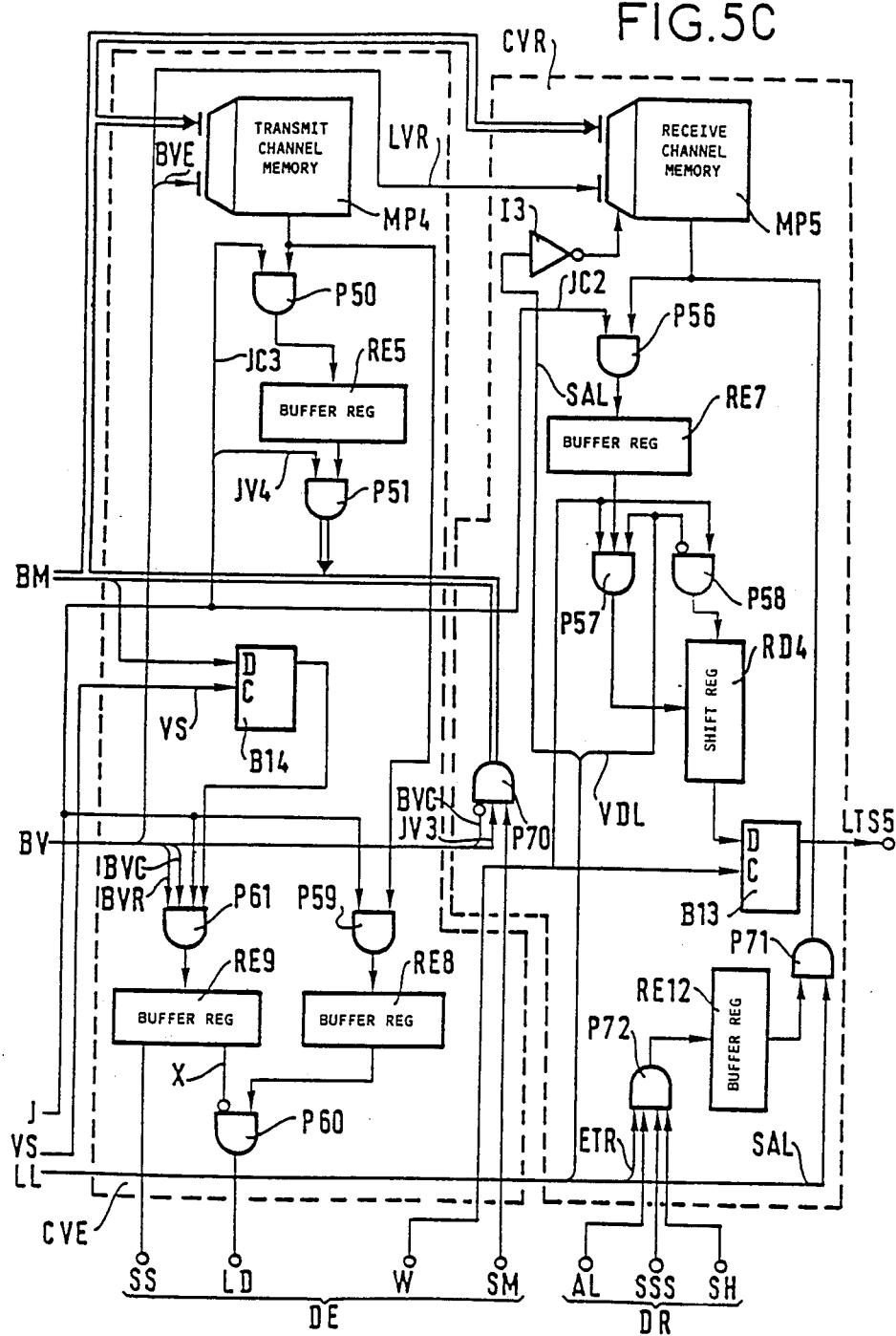

The transfer device DTR shown in FIGS. 5A, 5B and 5C firstly comprises an interface IP3 analogous to the interfaces IP1 and IP2, this interface comprising a decoder DC3 with its inputs connected to the address bus BA and to the control bus BK of the microprocessor MP of the terminal unit which comprises it; its outputs di are connected to select, write and read inputs of different components of the transfer device.

The interface IP3 also comprises a plurality of AND gates P40 through P45 and also two buffer registers RC7, RC8 attached in the diagrams to the arrangements that they serve.

The shared buffer memory circuit TP is essentially based on a common buffer memory M4 which has a threefold function: transmit buffer for information to be transmitted from the multiplex link LT5 to the transmitter device DE via the transmit channel circuit CVE; receive buffer for information to be transmitted from the receiver device DR to the multiplex link LTS5 via the receive channel circuit CVR; loopback buffer between transmit channel circuit CVE and receive channel circuit CVR for tests purposes.

These operations are controlled by the microprocessor of the terminal unit which comprises the transfer device; this microprocessor is assisted by the control logic LOG which governs the various processes involved.

To this end the channel buffer register RC7 is provided for storing the number of the channel being processed that it receives via the multiple gate P44. The microprocessor can verify the content of the channel register RC7, the outputs of which are connected for this purpose to a common internal bus BG via a gate P43, the common internal bus BG having access to the data bus BD of the microprocessor via two multiple opposite facing gates P40 and P41 controlled by the signals di from corresponding individual outputs of the decoder DC3 and the gates P44 and P45.

The buffer register RC8 stores the information relating to a channel which the microprocessor provides it with via the buses BD and BG and the gates P41 and P42, the latter being activated by the decoder DC3 in the same way as the other three gates previously mentioned. The information relating to channels comprising attenuation indications for the transmit and receive directions and an active or idle state indication for the channel concerned may be retransmitted to the microprocessor for verification from the information register RC8 via the gates P45 and P40 appropriately activated by the decoder DC1.

The information supplied by the formation register RC8 is transmitted to an information memory M3 the data inputs of which are connected to the register output via multiple dates P46, P47.

The information memory M3 and the common buffer memory M4 have common addressing inputs, of which there are five in the example shown, being addressed in common through the intermediary of two multiplexers MX6 and MX7 in series which also serve a sixth of the eight addressing inputs of the common memory M4.

The multiplexer MX6 receives four addresses:

an address supplied via a link MVT by a transmit counter CR4 for writing data arriving on the multiplex link LTE5 to the common memory M4, the transmit counter CR4 being timed by the clock signal W and triggered by the multiframe synchronization signal SMT provided by the transmitter device DE, the counter being preset prior to triggering;

an address corresponding to a transmit channel number on the multiplex link MICE, which is supplied to it by the counter CR2 of the transmitter device DE via the link MVE, for the purpose of reading in the common memory M4 that which corresponds to the content of the transmit buffer for this channel;

an address corresponding to the receive channel number on the multiplex link MICR, which is applied to it by the counter CR3 of the receiver device DR via the link MVR for the purpose of writing in the common memory M4 that which corresponds to the content of the receive buffer for this channel;

an address supplied via a link MVS by a receive counter CR5 for transfer of the content of the common memory M4 for the channel designated to the multiplex link LTS5 via the receive channel circuit CVR, the receive counter CR5 being timed and synchronized in the same way as the transmit counter CR4, but from a different initial position.

The multiplexer MX7 is adapted to receive either the address supplied by the multiplexer MX6 or an address supplied by the microprocessor of the terminal unit via the channel register RC7 and it is connected via a multi-wire link LAD to the addressing inputs concerned of the memories M3, M4.

The multiplexers MX6 and MX7 are respectively controlled by signals JA and JB transmitted over links with the same name and produced by an automatic device comprising a control read only memory MP6 the outputs of which are connected to an instruction buffer register RE11 via a multiple AND gate P62.

A validation input of the information memory M3 is controlled through the intermediary of a validation flip-flop B18 receiving on its input a validation signal JS2 supplied by the instruction register RE11, this flip-flop being itself activated by the clock signal HT that the receiver device DR supplies.

A multiple AND gate P48 connects the output of the information memory M3 to an auxiliary bus V providing loopback access to the information memory M3 via the gate P47, in parallel with the information register RC8.

The gates P47 and P48 are enabled oppositely by a validation signal JC1 and its complement from the instruction RE11.

The control read only memory MP6 in this instance provides 16-bit words to the instruction register RE11; to this end it is addressed partially in loopback mode via a link JE by the five most significant bits which it supplies to the instruction register on each read operation and on the other hand by five bits from an addressing register RE10.

The addressing register RE10 receives its contents from various sources via a multiple AND gate P63 which is activated by the clock signals HT produced by the transmitter device DE, as is the gate P62.

The automatic device implements the five functions corresponding to the five modes for addressing memories M3 and M4 and yielding five possibilities for injection of address data into the addressing register RE10 via the gate P63.

In the case of writing the information memory M3, the microprocessor of the terminal unit activates an output di of the decoder DC3 which corresponds to an input in a first bit position in the register RE10 via the gate P63.

In the case of writing the common buffer memory M4 for an address provided over the link MVT by the transmit counter CR4, a transmit decoder DC4 controlled by the counter CR4 is operative in a second bit position in the addressing register RE10 via the gate P63.

Note also that the decoder DC4 supplies a common channel signaling indication VS to the transmit channel circuit CVE in common channel signaling mode for the channel 24 containing the signaling bits transmitted over the link MICE.

In the case of reading the common buffer memory M4 for an address supplied over the link MVE by the counter CR2 of the transmitter device DE, an input command in the third bit position in the addressing register RE10 is supplied by a flip-flop B15 receiving the clock signal STC from the transmitter device DE.

In the case of writing the common buffer memory M4 for an address supplied over the link MVR by the counter CR3 of the receiver device DR, an input command in a fourth bit position of the addressing register RE10 is supplied by a write authorisation flip-flop B16 via a link ETR when a signal is received from the receiver device via the write control link EC.

In the case of reading the common buffer memory M4 for an address supplied by the receive counter CR5, the read signal is provided by a decoder DC5 activated by the counter CR5 at one input and a fifth bit position of the address register RE10.

The shared buffer memory circuit TP is connected as shown in FIG. 2 to the transmit channel circuit CVE and the receive channel circuit CVR, to the receiver REC and to the multiplex link LTE5 from the terminal unit which comprises it.

To this end an exchange bus BM connects the buffer memory circuit TP and the two channel circuits CVE, CVR; it also receives the samples transmitted on the multiplex link LTE5.

Access to the common buffer memory M4 from the bus BM is effected through the intermediary of a gate P48 controlled through the instruction register RE11 through the intermediary of a bit JW1 transmitted over a link with the same name providing for transferring the most significant bit and the following bit second. The output of the common buffer memory M4 is connected to the exchange bus BM via a gate P49 controlled by the complements of the bits transmitted over the link JW1.

A loop buffer register RE4 inserted between two multiple AND gates P52 and P53 one with its inputs and the other with its outputs connected to the exchange bus BM handle transfers between positions within the common buffer memory M4. The gates P52 and P53 are each controlled by a specific access bit transmitted from the instruction register over a link JC1 for the gate P53 and over a link JV3 for the gate P52, the latter being also controlled by a bit supplied to it by the information memory M3 via a link K for each transfer.

An input shift register RD3 is connected to the end of the multiplex link LTE5 in order to receive the data at the timing rate of the clock signals W which it receives from the clock select circuit CHS.

The parallel outputs of the input register RD3 feed a multiple AND gate P54 which controls one of the outputs of the transmit decoder DC4 for parallel transmission of the bits received one sample at a time.

A buffer register RE6 in series with a multiple AND gate P55 provides for sample by sample transfer in the direction towards the exchange bus BM under the control of a bit JV2 supplied by the instruction register RE11, each sample from the register RE6 being then sent to the transmit buffer area of the common buffer memory M4. As indicated above the buffer memory is addressed on the one hand by the five most significant bits which are supplied by the multiplexer MX7, transmitted over the link LAD and also received by the information M3 for addressing purposes.

Two supplementary bits, the two most significant bits from the instruction register, are also transmitted in parallel via a link JD to the common buffer memory M4 for addressing purposes.

A flip-flop B17 receives a bit JS1 supplied by the instruction register RE11; it is activated by the clock signal HT and controls the validation input v of the common buffer memory M4.

The samples received by the common buffer memory M4 from the multiplex link LTE5 are transmitted to the transmit channel circuit CVE via the exchange bus BM; they are received in this channel circuit by a transmit channel memory MP4 for sending to the transmitter device DE.

The transmit channel memory MP4 is a read only memory; it converts the sample bits received from the multiplex link LTE5 for transmission to the transmitter circuit CE of the transmitter device (FIG. 3A). In the embodiment shown, each sample received consisting of eight bits encoded according to the $\mu$-law, as received from the multiplex link LTE5 and stored in the transmit buffer area of the common buffer memory M4, is used to address the transmit channel memory MP4, by means of its first seven bits. Three supplementary addressing bits which correspond to the predicted attenuation level are supplied by the information memory M3 via the gate P48 and a link BVE from the auxiliary bus BV.

For each address cycle the transmit channel memory MP4 supplies a sample on seven bits in parallel to a multiple AND gate P50 which receives the received sample bit not used for addressing.

The 8-bit sample obtained is also transmitted to a gate R59 which is validated by a bit JC3 from the instruction register RE11.

The gate P59 has its inputs connected to the parallel inputs of a transit buffer register RE8 which supplies in parallel the eight bits which it receives from the gate P59 to a gate P60 for transmitting them to the data input of the transmitter circuit CE (FIG. 3A) via the link LD.

The gate P60 is inhibited by a specific complemented bit X supplied by a signaling buffer register RE9 and corresponding to a signaling transmission indication in common channel signaling mode and not in channel-associated signaling mode.

The register RE9 thus receives the above indication in the form of a bit together with two status bits to be transmitted to the transmitter circuit DE via the link SS. These status bits are supplied by a gate P61 of which one input is connected to the output of a flip-flop B14 from which it receives the bit JC3 from the instruction register RE11 and of which two supplementary inputs are connected to two bit outputs, an unavailable state bit BVC and an available state bit BVR, from the information memory M3.

The gate P50 at the transmit channel memory MP4 output is connected to a buffer register RE5 itself connected to the exchange bus BM by a gate P51 controlled by a bit JV4 from the instruction register RE11, to permit loopback to the common buffer memory M4 and more precisely to the transmit to receive loopback area.

The receiver device DR also accesses the exchange bus BM giving access to the buffer memory; to this end the output SM of the receiver circuit CR (FIG. 4A) is connected to a multiple AND gate P70 controlled by a bit JV3 from the instruction register RE11 and by the complement of the availability bit BVC.

The samples transferred into the receive buffer area of the common buffer memory M4 from the gate P70 are then retransmitted to the receive channel memory MP5 via the exchange bus BM for transmission over the multiplex link LTS5.

The receive channel memory MP5 is a read only memory of the same type as the memory MP4; like the latter, it receives on its addressing inputs seven of the eight bits of an encoded sample from the multiplex link MICR as well as three supplementary bits which correspond to the predicted attenuation level.

It supplies a sample on seven bits with which is associated an eighth bit which has not participated in addressing, under the same conditions as previously.

The receive channel memory MP5 is validated by the complement of a least significant binary signal SAL supplied to an inverter I3 by the receive decoder DC5.

The outputs of the receive channel memory MP5 and the eighth bit are supplied to a multiple AND gate P56 providing access to a buffer register RE7. The gate P56 is validated by a bit JC2 from the instruction register RE11.

The register RE7 feeds in parallel a parallel-series shift register RD4 via a gate P57 receiving also the clock signals W supplied by the select circuit CHS (FIG. 3B) and a write authorization VDL supplied by the receive decoder DC5.

The parallel-series register RD4 is read bit by bit at the timing rate of the clock signals W and in the absence of the write authorization VDL under the control of a gate P58 receiving the clock signals W and the complement of the signal VDL.

A flip-flop B13 at the output of the parallel-series register RD4 and driven by the clock signals W handles transmission of the sample bits over the multiplex link LTS5 to the input of which it is connected.

An alarm buffer register RE12 connected via a gate P71 to an input of gate P56 and to the receive channel memory MP5 is used to inject alarm signaling bits from the receiver device into the multiplex link LTS5. To this end the alarm register RE12 has its inputs connected to a gate P72 receiving the signals AL, SSS and SH from the receiver circuit CR.

The multiple AND gates P71, P72 are respectively validated by the bit SAL from the receive decoder DC5 and by the output ETR of the write authorization flip-flop B16 of the control logic LOG.

Slip between the local clock and the remote clock must be conventionally detected and the transfer device DTR must provide for a frame to be omitted or repeated.

To this end the buffer area of the common buffer memory M4 provides for storing two frames, that is 64 bytes; the frames received via the link SM are alternately stored in two receive buffer half-areas, reading being effected in one or the other, and the microprocessor of the terminal unit is advised by an interrupt IN from the output of the flip-flop B20 of the slip detector DGH.

Slip detection proper is effected by comparing the address read at the output of the receive counter CR5 and the address MVR supplied by the counter CR3 of the receiver device DR, one of these addresses being applied to the decoder DC5 and the other to a decoder DC6.

Frame slip is detected when the frame start indicated by the receive counter CR5 enters a guard band of the address MVR, consisting for example of the addresses of the first seven bytes and the last byte in the receive buffer area.

The output SCD of the decoder DC6 and an output of the decoder DC5 are to this end connected to an AND gate P73 to control the sending of an interrupt IN to the microprocessor interrupt control circuit.

The flip-flop B20 is reset to zero by a signal DL from the register RC5 of the receiver device when the frame omission or repetition has been carried out.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. An adapter terminal unit for connecting to a time-division switching center at least one digital trunk conforming to a signalling standard different from that normally applicable to the digital trunks connected to said switching center, said digital trunk including a transmit multiplex link and a receive multiplex link, said switching center including a switching network, and said adapter terminal unit being controlled via said switching network by a pool of microprocessor-equipped control units, said adapter terminal unit being connected to said switching network by multiplex links called switching network input/output lines, said adapter terminal unit comprising:
   a control circuit having a microprocessor;
   a space-division switching matrix;
   a bidirectional multiplex link;
   a common bus; and
   a transmitter device, a receiver device and a transfer device controlled by said microprocessor of said control circuit via said common bus;
   said transmitter device being connected to one end of said transmit multiplex link for the purpose of sending samples combining information bits from the switching center and supervisory signals provided in matched form via the microprocessor;
   said receiver device being connected to one end of said receive multiplex link for the purpose of separating information bits to be sent via the switching center and the supervisory signals to be matched via the microprocessor for processing by the control units; and
   said transfer device being connected to said switching matrix via said bidirectional multiplex link, and being connected to said transmitter device and to said receiver device, for the purpose of two-way exchange of samples between said digital trunk and said switching center following conversion and matching under the control of said microprocessor.

2. Adapter terminal unit according to claim 1, wherein the transfer device comprises a shared bidirectional buffer memory between the digital trunk and the switching center for matching their respective bit rates, said buffer memory being connected to a transmit channel circuit and to a receive channel circuit for the prupose of adapting the transmit and receive levels and codes.

3. Adapter terminal unit according to claim 2, wherein the shared buffer memory comprises a common buffer memory for samples from the switching center and samples from the digital trunk.

4. Adapter terminal unit according to claim 3, wherein the transmitter device is connected by a unidirectional multiplex link to the switching matrix of the unit and by a multiplex link to the receiver device for the purpose of loopback testing of the unit via the transfer device.

5. Adapter terminal unit according to claim 4, wherein the common buffer memory comprises a transmit buffer memory for the samples to transmit to the digital trunk, a receive buffer memory for the samples received from the digital trunk and a loopback buffer memory for testing the adapter terminal unit through the intermediary of the microprocessor of the unit.

6. Adapter terminal unit according to claim 5, wherein the common buffer memory is driven by the microprocessor of the unit via control logic comprising a control read only memory simultaneously and automatically addressing the common buffer memory and a memory for information relating to the various channel time slots, linked to channel counters of the transmitter, receiver and transfer devices of the unit or to the microprocessor.

7. Adapter terminal unit according to claim 1, wherein the transfer device comprises a device for detecting slip of the local clock signals from a general timebase of the switching center relative to the remote clock signals as recovered by an interface of the receiver device which is connected to the end of the receive multiplex link, said detector device comparing the output signals of one channel counter driven by the remote clock in the receiver device for the channels received via the receive multiplex link with the output signals of a receive counter driven by the corresponding local clock signals from the main timebase in the transfer device.

8. Adapter terminal unit according to claim 1, wherein the transmitter device comprises, in association, a sample formatter adapted to format the converted information samples and the common channel signaling bits supplied to it by the transfer device and the channel-associated signaling bits supplied to it by the microprocessor into samples to the standard applicable to the transmit multiplex link served, and an alarm signaling circuit controlled by the microprocessor and connected to the input of the formatter and two test circuits for respectively testing the transmit channels and the transmitted signaling bits.

9. Adapter terminal unit according to claim 8, wherein the formatter comprises an assembler circuit for constructing frames to be sent over the transmit multiplex link connected to the transfer device, from which it receives the information bits of the samples received from the switching center and where applicable the common channel signaling bits and to a channel signal memory which stores the channel-associated signaling bits supplied on each signaling state change via the microprocessor of the unit, and wherein the formatter further comprises a phase memory which is partially looped on itself to drive the formatter according to instructions from the microprocessor of the unit and from a clock output of the assembler circuit.

10. Adapter terminal unit according to claim 1, wherein the receiver device comprises, in association, a signaling circuit and a receiver which, connected to the end of the receive multiplex link, provide separately the bits of the received samples, the channel-associated signaling bits and the common channel signaling bits, said signaling circuit storing the signaling for the benefit of the microprocessor of the unit, for the purpose of their transfer to the control units of the switching center.

11. Adapter terminal unit according to claim 10, wherein the signaling circuit comprises a signaling state memory for each received channel which stores each state in coded form to permit filtering and a read only state change memory which receives the eighth bit of each sample received via the receive multiplex link and the content of the signaling state memory for the corresponding channel, said signaling state memory being driven by a sequencer consisting of a read only memory partially looped on itself for addressing purposes complemented by a signaling indication signal provided by the receiver and a control signal from the microprocessor of the unit.

* * * * *